US008906975B1

(12) United States Patent  
Dounis et al.

(10) Patent No.: US 8,906,975 B1
(45) Date of Patent: *Dec. 9, 2014

(54) CONVENTIONAL FLEXIBLE POLYURETHANE FOAM USING MDI

(75) Inventors: Dimitrios V. Dounis, Denver, NC (US); Dwayne Lewis Beard, Hickory, NC (US); Camden Eugene McLaughlin, Hickory, NC (US); Kimberly R. Fair, Conover, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/701,356

(22) Filed: Feb. 5, 2010

Related U.S. Application Data

(60) Provisional application No. 61/207,161, filed on Feb. 9, 2009.

(51) Int. Cl.
*C08G 18/18* (2006.01)

(52) U.S. Cl.
USPC ........... 521/128; 521/129; 521/130; 521/159; 521/170; 521/174

(58) Field of Classification Search
USPC .................. 521/128, 129, 130, 159, 170, 174
See application file for complete search history.

(56) References Cited

U.S. PATENT DOCUMENTS

| | | | |
|---|---|---|---|
| 3,741,917 A | 6/1973 | Morehouse | |
| 4,167,612 A | 9/1979 | Tucker et al. | |
| 4,205,136 A | 5/1980 | Ohashi et al. | |
| 4,239,856 A | 12/1980 | Rowton | |
| 4,365,025 A | 12/1982 | Murch et al. | |
| 4,525,490 A | 6/1985 | Smith | |
| 4,605,684 A | 8/1986 | Pcolinsky, Jr. | |
| 4,722,942 A | 2/1988 | Nichols et al. | |
| 4,833,176 A | 5/1989 | Wolf et al. | |
| 4,845,133 A | 7/1989 | Priester, Jr. et al. | |
| 4,910,231 A | 3/1990 | Pham et al. | |
| 4,950,694 A | 8/1990 | Hager | |
| 4,994,502 A | 2/1991 | Markovs et al. | |
| 5,010,117 A | 4/1991 | Herrington et al. | |
| 5,043,360 A | 8/1991 | Pham et al. | |
| 5,104,907 A | 4/1992 | Yoshimura et al. | |
| 5,145,882 A | 9/1992 | Samaritter et al. | |
| 5,171,759 A | 12/1992 | Hager | |
| 5,175,195 A | 12/1992 | Tani et al. | |
| 5,182,314 A | 1/1993 | Tani et al. | |
| 5,194,453 A | 3/1993 | Jourquin et al. | |
| 5,236,964 A | 8/1993 | Savoca et al. | |
| 5,270,348 A | 12/1993 | Muller et al. | |
| 5,332,764 A | 7/1994 | Tairaka et al. | |
| 5,334,689 A | 8/1994 | Muller et al. | |
| 5,367,050 A | 11/1994 | Tairaka et al. | |
| 5,369,138 A | 11/1994 | Gansen | |
| 5,436,277 A | 7/1995 | Narayan et al. | |
| 5,441,993 A | 8/1995 | Maretti | |
| 5,459,170 A | 10/1995 | Bleys et al. | |
| 5,482,980 A | 1/1996 | Pcolinsky | |
| 5,491,177 A | 2/1996 | De Witte | |
| 5,500,452 A | 3/1996 | Baker et al. | |
| 5,506,278 A | 4/1996 | Walmsley | |
| 5,521,226 A | 5/1996 | Bleys | |
| 5,530,034 A | 6/1996 | Narayan et al. | |
| 5,536,757 A | 7/1996 | Walmsley | |
| 5,538,779 A | 7/1996 | Mispreuve et al. | |
| 5,539,011 A | 7/1996 | Hilker et al. | |
| 5,565,498 A | 10/1996 | Chaffanjon et al. | |
| 5,594,039 A | 1/1997 | Gerber et al. | |
| 5,594,097 A | 1/1997 | Chaffanjon et al. | |
| 5,607,982 A | 3/1997 | Heyman et al. | |
| 5,618,854 A | 4/1997 | Skorpenske et al. | |
| 5,621,016 A | 4/1997 | Murty et al. | |
| 5,686,187 A | 11/1997 | Turnbach | |
| 5,686,526 A | 11/1997 | Turnbach | |
| 5,698,609 A | 12/1997 | Lockwood et al. | |
| 5,700,390 A | 12/1997 | Turnbach | |
| 5,700,869 A | 12/1997 | Turnbach | |
| 5,716,439 A | 2/1998 | Turnbach | |
| 5,877,227 A | 3/1999 | Murty | |
| 6,020,391 A | 2/2000 | Leenslag | |
| 6,063,825 A | 5/2000 | Isobe et al. | |

(Continued)

FOREIGN PATENT DOCUMENTS

| | | |
|---|---|---|
| EP | 0 257 441 A2 | 3/1988 |
| EP | 0547765 A1 | 6/1993 |
| EP | 0 608 626 A1 | 8/1994 |
| EP | 0 765 355 B1 | 4/1997 |
| EP | 1164153 A1 | 12/2001 |
| EP | 1174453 A1 | 1/2002 |
| EP | 1178061 A1 | 2/2002 |
| EP | 1234843 A1 | 8/2002 |
| EP | 1 471 086 A2 | 10/2004 |
| EP | 1 529 792 A1 | 5/2005 |
| EP | 1305352 B1 | 8/2005 |
| GB | 2 109 803 A | 6/1983 |
| GB | 2308373 A | 6/1997 |

(Continued)

OTHER PUBLICATIONS

ASTM Designation: D 3574-05 "Standard Test Methods for Flexible Cellular Materials—Slab, Bonded, and Molded Urethane Foams," Copyright ASTM International, 100 Barr Harbor Drive, West Conshohocken, PA 19428-2959; Aug. 2005, pp. 1-25.

(Continued)

*Primary Examiner* — John Cooney
(74) *Attorney, Agent, or Firm* — Nelson Mullins Riley & Scarborough LLP

(57) ABSTRACT

A conventional flexible polyurethane foam, made using methylene diphenyl diisocyanate (MDI), having a bulk foam density in the range of 2.5 pounds per cubic foot or lower and having a foam hardness or IFD in the range of 10 to 90 lb/50 in$^2$. The present invention is also directed to the method for the making thereof.

18 Claims, 1 Drawing Sheet

(56) References Cited

U.S. PATENT DOCUMENTS

| | | | |
|---|---|---|---|
| 6,080,800 A | 6/2000 | Frey et al. |
| 6,096,237 A | 8/2000 | Narayan et al. |
| 6,096,238 A | 8/2000 | Lutter et al. |
| 6,133,481 A | 10/2000 | Singh et al. |
| 6,136,878 A | 10/2000 | Free et al. |
| 6,158,815 A | 12/2000 | Sugie et al. |
| 6,180,686 B1 | 1/2001 | Kurth |
| 6,201,035 B1 | 3/2001 | Tuinman et al. |
| 6,239,186 B1 | 5/2001 | Mansfield et al. |
| 6,245,825 B1 | 6/2001 | Bleys |
| 6,316,514 B1 | 11/2001 | Falke et al. |
| 6,352,658 B1 | 3/2002 | Chang et al. |
| 6,372,812 B1 | 4/2002 | Niederoest et al. |
| 6,376,698 B1 | 4/2002 | Bleys |
| 6,417,241 B1 | 7/2002 | Huygens et al. |
| 6,432,543 B2 | 8/2002 | Harrison et al. |
| 6,457,777 B1 | 10/2002 | Kazuno et al. |
| 6,465,569 B1 | 10/2002 | Kurth |
| 6,521,674 B1 | 2/2003 | Haley et al. |
| 6,579,912 B2 | 6/2003 | Parfondry et al. |
| 6,583,192 B2 | 6/2003 | Falke et al. |
| 6,586,486 B2 | 7/2003 | Falke et al. |
| 6,590,008 B1 | 7/2003 | Parfondry et al. |
| 6,593,387 B2 | 7/2003 | Parfondry et al. |
| 6,617,369 B2 | 9/2003 | Parfondry et al. |
| 6,649,107 B2 | 11/2003 | Harrison et al. |
| 6,660,783 B2 | 12/2003 | Arlt et al. |
| 6,734,220 B2 | 5/2004 | Niederoest et al. |
| 6,747,068 B2 | 6/2004 | Kelly |
| 6,759,448 B2 | 7/2004 | Toyota et al. |
| 6,765,034 B2 | 7/2004 | Nishida et al. |
| 6,774,153 B2 | 8/2004 | Parfondry et al. |
| 6,784,217 B2 | 8/2004 | Parfondry et al. |
| 6,784,218 B1 | 8/2004 | Apichatachutapan et al. |
| 6,797,736 B1 | 9/2004 | Smiecinski et al. |
| 6,852,403 B2 | 2/2005 | Harrison et al. |
| 6,855,742 B2 | 2/2005 | Hager et al. |
| 6,858,655 B1 | 2/2005 | Hofmann et al. |
| 6,864,296 B2 | 3/2005 | Kurth |
| 6,867,239 B2 | 3/2005 | Kurth |
| 6,881,763 B2 | 4/2005 | Kurth |
| 6,884,825 B2 | 4/2005 | Daunch et al. |
| 6,919,384 B2 | 7/2005 | Yu |
| 7,169,824 B2 | 1/2007 | Bleys et al. |
| 7,238,730 B2 | 7/2007 | Apichatachutapan et al. |
| 7,268,170 B2 | 9/2007 | Anderson et al. |
| 7,456,229 B2 | 11/2008 | Hager et al. |
| 8,058,343 B2 | 11/2011 | Liu et al. |
| 8,097,675 B2 | 1/2012 | Finder et al. |
| 2002/0058774 A1 | 5/2002 | Kurth et al. |
| 2003/0060528 A1 | 3/2003 | Parfondry et al. |
| 2003/0087977 A1 | 5/2003 | Parfondry et al. |
| 2003/0105178 A1 | 6/2003 | Kurth |
| 2003/0143910 A1 | 7/2003 | Mashburn et al. |
| 2003/0158280 A1 | 8/2003 | Daunch et al. |
| 2003/0212155 A1 | 11/2003 | Parfondry et al. |
| 2004/0029988 A1 | 2/2004 | Kurth |
| 2004/0034163 A1 | 2/2004 | Kurth |
| 2004/0102596 A1 | 5/2004 | Kurth |
| 2004/0147627 A1 | 7/2004 | Hager et al. |
| 2004/0152796 A1 | 8/2004 | Muller et al. |
| 2004/0162385 A1 | 8/2004 | Krebs |
| 2004/0186192 A1* | 9/2004 | Smiecinski et al. .......... 521/170 |
| 2004/0254256 A1 | 12/2004 | Lockwood et al. |
| 2004/0259968 A1 | 12/2004 | Krebs |
| 2005/0032973 A1 | 2/2005 | Krebs et al. |
| 2005/0070620 A1 | 3/2005 | Herrington et al. |
| 2005/0101681 A1 | 5/2005 | Kaushiva et al. |
| 2005/0176840 A1 | 8/2005 | Chan et al. |
| 2005/0182228 A1 | 8/2005 | Kurth |
| 2005/0222291 A1 | 10/2005 | Pirkl et al. |
| 2006/0060486 A1 | 3/2006 | Castleberry |
| 2006/0073321 A1 | 4/2006 | Kaushiva et al. |
| 2006/0084710 A1 | 4/2006 | Meyer-Ahrens et al. |
| 2006/0128928 A1 | 6/2006 | Wershofen et al. |
| 2006/0142529 A1 | 6/2006 | Tiede et al. |
| 2007/0155941 A1 | 7/2007 | Nefzger et al. |
| 2007/0282028 A1 | 12/2007 | Harre et al. |
| 2007/0293594 A1 | 12/2007 | Heisler et al. |
| 2010/0160470 A1 | 6/2010 | Smiecinski et al. |
| 2010/0160473 A1 | 6/2010 | Neff et al. |
| 2010/0249260 A1 | 9/2010 | Casati et al. |

FOREIGN PATENT DOCUMENTS

| | | |
|---|---|---|
| GB | 2 329 642 A | 3/1999 |
| JP | 59-166537 | 9/1984 |
| JP | 60-181115 | 9/1985 |
| JP | 1-104611 | 4/1989 |
| JP | 3-45618 | 2/1991 |
| JP | 7-3062 | 1/1995 |
| JP | 11-171963 | 6/1999 |
| JP | 2003-342343 | 12/2003 |
| JP | 2006-45267 | 2/2006 |
| WO | 94/24183 | 10/1994 |
| WO | 95/34591 | 12/1995 |
| WO | 96/06874 | 3/1996 |
| WO | WO 00/08083 A1 | 2/2000 |
| WO | 0015684 A1 | 3/2000 |
| WO | WO 00/55232 A1 | 9/2000 |
| WO | 0073368 A1 | 12/2000 |
| WO | WO 00/73362 A2 | 12/2000 |
| WO | WO 00/73363 A1 | 12/2000 |
| WO | WO 01/07521 A1 | 2/2001 |
| WO | WO 01/32735 A1 | 5/2001 |
| WO | WO 01/32736 A1 | 5/2001 |
| WO | WO 01/60884 A1 | 8/2001 |
| WO | WO 02/10245 A1 | 2/2002 |
| WO | WO 02/10246 A1 | 2/2002 |
| WO | WO 02/059175 A2 | 8/2002 |
| WO | 2004011518 A2 | 2/2004 |
| WO | WO 2004/014976 A1 | 2/2004 |
| WO | WO 2004/014980 A1 | 2/2004 |
| WO | 2004071281 A2 | 8/2004 |
| WO | 2004096883 A1 | 11/2004 |
| WO | WO 2005/003205 A1 | 1/2005 |
| WO | 2006116456 A1 | 11/2006 |
| WO | 2007/042407 A1 | 4/2007 |
| WO | WO 2011/106377 A1 | 9/2011 |

OTHER PUBLICATIONS

Article, "A New Era for MDI Flexible Polyurethane Slabstock Foam," Knaub et al. Journal of Cellular Plastics, vol. 33—Mar. 1997, pp. 159-184.

Technical Bulletin 117, "Requirements, Test Procedure and Apparatus for Testing the Flame Retardance of Resilient Filling Materials Used in Upholstered Furniture," State of California Department of Consumer Affairs, Bureau of Home Furnishings and Thermal Insulation, 3485 Orange Grove Avenue, North Highlands, CA 95660, Mar. 2000, pp. 1-8.

U. S. Appl. No. 12/640,210, Dounis et al.

European Patent Office International Search Report for WO2011/106377.

Publication: Smiecinski et al., BASF Corp., Michigan, "Visco-Elastic Polyurethane Foam: The Impact of Isocyanate Upon Foam Morphology", Sep. 26, 2006, p. 405-416.

* cited by examiner

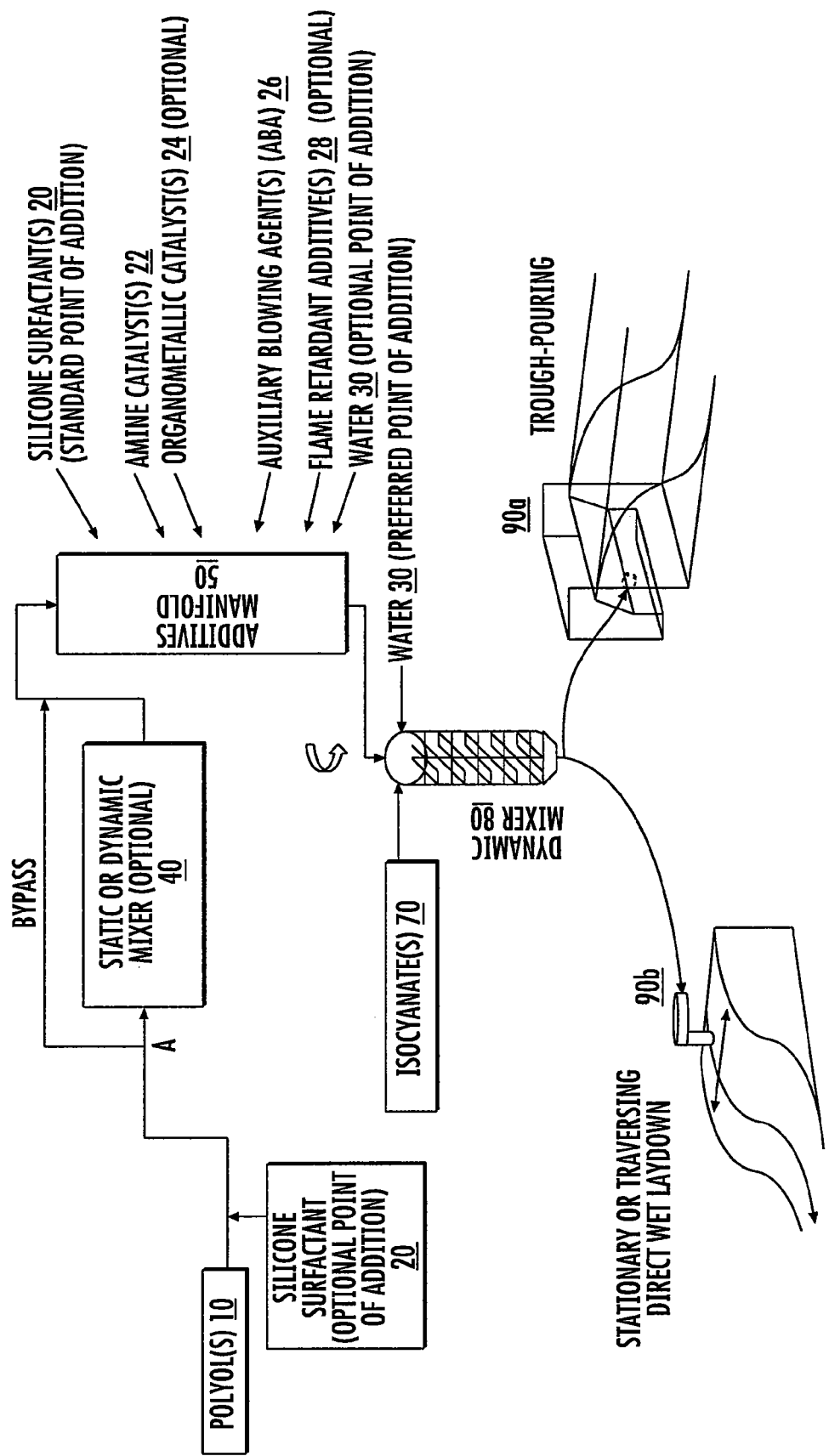

1

CONVENTIONAL FLEXIBLE POLYURETHANE FOAM USING MDI

CROSS-REFERENCE TO RELATED APPLICATIONS

This application claims priority from U.S. patent application Ser. No. 61/207,161 filed on Feb. 9, 2009. The disclosure of which is incorporated herein by reference.

FIELD OF THE INVENTION

The present invention relates to a conventional flexible polyurethane foam using methylene diphenyl diisocyanate (MDI), including a conventional flexible slabstock polyurethane foam made using MDI, its formulation, and the process for the making thereof.

BACKGROUND OF THE INVENTION

Flexible slabstock polyurethane foam for furniture and bedding has traditionally been produced using toluene diisocyanate (TDI) as a basic raw material. In the United States, methylene diphenyl diisocyanate (MDI) has predominantly been used in polyurethane foam applications other than flexible slabstock polyurethane foam applications such as furniture and bedding. MDI has been used in, for example, molded polyurethane foam such as automotive applications; rigid polyurethane foam such as insulation, construction and packaging; microcellular froth polyurethane foam such as footwear and gasketing; and viscoelastic ("memory") polyurethane foam chemistries. Due in part to the inherently different chemical reaction kinetics as well as the differences in foam stabilization requirements for processing using MDI as opposed to TDI, MDI does not readily fit the criteria for use in continuous flexible slabstock foam formulations. In Europe, MDI has only recently been utilized to produce high density, namely greater than 2.5 pounds per cubic foot (PCF) high resilience slabstock foams. In general terms, the complexity of formulation, speed of reactivity and mechanical processing limitations have prevented the commercialization of low density, soft MDI-based foams since the advent of the flexible polyurethane foam industry in the 1950s. Furthermore, the furniture and bedding markets in the United States use a larger volume of non-high resilience, also referred to as conventional, flexible polyurethane foam relative to the European foam market.

In the wake of Hurricane Katrina in the United States, many of the necessary flexible polyurethane foam raw materials became temporarily but seriously unavailable due to unplanned chemical plant shutdowns and transportation problems. More recently, a similar situation with TDI specifically, due to global demand exceeding current supply, resulted in allocated supply and significant price increases.

The cost of polyurethane foam, whether TDI or MDI-based, is driven almost solely by chemical cost. Lower density foams cost less per unit volume than higher density foams, making them more attractive to end users, given acceptable performance. In the United States market, where foam is considered commodity-like, due to similarity of product and aggressive pricing, high-density European-style MDI foams have never widely gained acceptance.

Thus, there is a need to reduce dependence on potentially scarce raw materials to produce a MDI-based conventional flexible polyurethane foam, more particularly one that is acceptable to the particular needs of the furniture, bedding and other industries. Accordingly, there is a need for an alternative low-density conventional flexible slabstock polyurethane foam.

SUMMARY OF THE INVENTION

The present invention is directed to a low-density conventional polyurethane foam, made using methylene diphenyl diisocyanate (MDI), having a bulk foam density in the range of 2.5 pounds per cubic foot or lower and having a foam hardness or 25% Indentation Force Deflection (IFD) in the range of 10 to 90 lb/50 in$^2$ with a support factor being both lower than that of a high resilience flexible slabstock polyurethane foam and more characteristic of a support factor of a typical TDI-based conventional foam.

The present invention is directed to a conventional flexible polyurethane foam having a bulk foam density of 2.5 pounds per cubic foot (PCF) or lower and having a foam hardness or IFD (measured in accordance with test method ASTM 3574—Test B1) in a range of 10 to 90 lb/50 in$^2$.

The present invention is directed to a conventional flexible polyurethane foam that is made without or substantially free of TDI.

In one aspect of the present invention, the conventional flexible polyurethane foam passes the requirements of the state of California Technical Bulletin 117 without the use of a flame retardant additive.

The present invention is directed to a method of making a conventional flexible polyurethane foam comprising reacting MDI with a conventional polyol in the presence of a blowing agent and made without or substantially free of TDI.

In another aspect of the method of the present invention, the method of making a conventional flexible polyurethane foam comprises reacting a conventional polyol with methylene diphenyl diisocyanate in the presence of a blowing agent in a one-shot continuous process.

The present invention is also directed to the process of making of a conventional flexible polyurethane foam using MDI.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, not necessarily to scale, wherein:

FIG. 1 is a process flow diagram illustrating a method of making a conventional flexible slabstock polyurethane foam using MDI in accordance with the present invention.

DETAILED DESCRIPTION OF THE INVENTION

The following detailed description a the embodiment(s) is merely exemplary in nature and is in no way intended to limit the invention, its application, or uses.

The polyurethane foam of the present invention is referred to herein as being of the conventional flexible polyurethane foam type in the sense that conventional foam typically has a cell structure that is more uniform, thus having a less randomly distributed cell size, than high resilience polyurethane foam. A conventional foam typically has a lower support factor and a lower resilience than high resilience polyurethane foam. In addition, a conventional foam typically has a lower density relative to high resilience polyurethane foam.

The conventional flexible polyurethane foam of the present invention is made using methylene diphenyl diisocyanate, also commonly referred to as diphenyl methane diisocyanate, (MDI). Preferably, MDI is either pure MDI or in the form of a mixture including, but not limited to, any amount or ratio of isomers 4,4'-diphenylmethane diisocyanate, 2,4'-diphenylmethane diisocyanate, 2,2'-diphenylmethane diisocyanate and optionally blended with any polymeric, modified, or prepolymer MDI species. The isomers may be in any ratio or in any blend of these isomer polyisocyanates with a blend average isocyanate functionality of ≥2. Examples of commercially available MDI products pertaining to the description above include, but are not limited to: No. 280 Isocyanate, No. 278 Isocyanate—BASF Corp.; MONDUR™ 1488—Bayer Material Science; PAPI® 20, PAPI® 27, PAPI® 94, PAPI® 95, PAPI® 580N, PAPI® 901—DOW Chemical Co.; SUPRASEC® 5005, SUPRASEC® 6521, SUPRASEC® 6522, SUPRASEC® 9597, SUPRASEC® 7050—Huntsman Petrochemical Corporation.

Thus, the conventional flexible polyurethane foam made using MDI of the present invention serves as an alternative to the conventional polyurethane foam made using toluene diisocyanate (TDI). TDI has become a relatively expensive foam ingredient of which the supply remains unstable. Thus, the conventional flexible polyurethane foam of the present invention provides the potential to introduce a new flexible polyurethane foam with features unique to the application of MDI foam chemistry.

A conventional flexible polyurethane foam to be useful for bedding and furniture is required in its industry to have a bulk foam density in the range of 2.5 pounds per cubic foot (PCF) or lower, more preferably ≤1.8 PCF, and a foam hardness or IFD (measured in accordance with test method ASTM 3574—Test B1) in the range of 10 to 90 lb/50 in$^2$ with a cell structure and support factor (being lower than as it is with high resilience polyurethane foams) which impart the required "feel" of comfort as required by these applications.

Foam hardness is measured in accordance with the ASTM D3574 standard. Pursuant to ASTM D3574 Test B1, the foam is pre-flexed (via a 50 in$^2$ round indentor) twice at 75% compression of the foam specimen's original height, thereafter the foam is allowed to rest or recover for six minutes. It is subsequently followed by the indentor lowering itself to 25% of the foam specimen's original height. It is at this point that the force required to depress and maintain the indentor at 25% of the foam's original height for a period of one minute is measured and recorded as the foam hardness; however, the test continues as follows: the indentor next depresses to 65% of the foam's original height and the force required to maintain for one minute is recorded as being the 65% IFD. Next the indentor re-positions to the 25% height level and after one minute reads and reports this force requirement as 25% IFD-Return. Therefore, this generates three values whereby the foam hardness is characterized.

The 25% IFD-original value as it pertains to this present invention is in the range of 10 to 90 lb/50 in$^2$, preferably 10 to 40 lb/50 in$^2$. Foam support factor is defined as follows:

$$\text{Support Factor} = \frac{65\% \text{ IFD Value}}{25\% \text{ Original IFD Value}}$$

Foams having a high support factor are considered to be high resilience and are primarily used for seating and cushioning applications; whereas, foams having a low support factor are considered to be conventional flexible foam which is used more predominantly in bedding applications as well as for non-seating applications in furniture manufacturing. Although there are similarities between the equipment used for manufacturing high resilience TDI-based foam versus conventional TDI-based foam, the approaches from a chemical foam formulation perspective are distinctly different for these two foam types, as is known to those skilled in the art.

As indicated previously, MDI, however, does not lend itself to achieve products in the density range of 2.5 pounds per cubic foot (PCF) or lower and until the present invention has prevented products in the desired WD range. However, in the method of the present invention, MDI is used to make a conventional foam wherein both the desired foam density and the desired foam hardness are achieved independently of one another. Furthermore, the conventional flexible polyurethane foam of the present invention is achieved without or substantially free of TDI. The conventional flexible polyurethane foam of the present invention is achieved with or without the use of load-bearing (support-enhancing) polyols including, but not limited to, copolymer polyol, polymer polyol, graft polyol, PIPA polyol, crosslinker, and polyhamstoff dispersion (PHD) polyol, and a combination thereof.

The present invention relates to a process for preparing a conventional flexible slabstock polyurethane foam. In particular, the present invention relates to a process for preparing a conventional flexible slabstock polyurethane foam using MDI to achieve a foam with a density in a range of 2.5 pounds per cubic foot (PCF) or lower, more preferably ≤1.8 PCF (in accordance with ASTM 3574 Test A).

Referring now to the Figures, FIG. 1 illustrates a method of making a conventional flexible slabstock polyurethane foam made using MDI. FIG. 1 illustrates a one-shot continuous manufacturing process.

As shown in FIG. 1, one or more polyols 10 as described in Table 1, including at least a conventional polyether polyol, are fed to an additives manifold 50.

TABLE 1

| Polyols Type | Molecular Weight Range (g/mol) | Ethylene oxide (EO) Range (%) | Propylene oxide (PO) Range (%) | Solids Range (%) |
|---|---|---|---|---|
| Conventional | 700-4000 | 0-75 | 25-100 | 0 |
| Graft | 1500-8500 | — | — | 1-75 |

With reference to the conventional polyether polyol, the polyol is a polyalkyleneoxide polyether glycol having a molecular weight in a range of from about 700 to 4,000 g/mol with the weight percent content of ethylene oxide groups being from about zero to 75 percent of the total alkylene oxide group content (therefore, the remaining 25 to 100 weight percent of the total alkylene oxide groups being propylene oxide groups) while having a hydroxyl functionality ranging from about 2 to 8, preferably from about 2 to 3. Examples of commercially available conventional slabstock polyether polyols include, but are not limited to, PLURACOL® P-1385, P-1388, P-4150 and P-4156—BASF Corp., ARCOL® F-3022, ARCOL® PPG-2000, ARCOL® PPG-3000, ARCOL® PPG-4000, ACCLAIM® F-3040, ACCLAIM® 3300N—Bayer Corp., VORANOL® 3136 and VORANOL® 3137—Dow Chemical Co., JEFFOL® PPG-2000, FC-31-56, FE-1137, PPG-2000, PPG-2801, PPG-3703, PPG-3706, PPG-3709—Huntsman Petrochemical Corp. The present invention uses a conventional polyether polyol(s) with or without the use of a graft polyether polyol. The present invention uses a conventional polyether polyol(s) with or without the use of a high resilience polyol(s), preferably without the use of a high resilience polyol.

Referring to the graft polyol, the polyol has a molecular weight in a range of from about 1,500 to 8,500 g/mol and a solids level ranging up to about 75 percent by weight of the graft polyol as realized through chain growth copolymer polyol chemistry such as wherein the free-radical polymerization of styrene and acrylonitrile copolymerized with a polyol itself to produce a grafted polyol of the SANs type, or through step-growth polyol polymerization copolymer polyol chemistry such as wherein polyurea particles resulting from the reaction of diamines with diisocyanate in the presence of polyol thereby being dispersed in polyol, or through PIPA polyol chemistry such as wherein an alkanolamine has been reacted with a diisocyanate in the presence of a polyol to produce a dispersion of polyurethane particles in polyol. Examples of commercialized graft polyols, polymer polyols, or copolymer polyols include, but are not limited to, PLURACOL® P-637, P-1365, P-1441, P-1442, P-1443, P-1543, P-4600, P-4800, P-4815, P4830, P-4850—BASF Corp., ARCOL® E-919, ARCOL® HS-100—Bayer Corp., VORANOL® 3943A—Dow Chemical Co., Alcupol P-3041—Repsol Chemical Co. The present invention uses a conventional polyether polyol with or without the use of a graft polyol, preferably without a graft polyol.

In accordance with the present invention, these polyols may have either randomly distributed ethylene oxide and propylene oxide groups or may be of the blocked type of polyol wherein the ethylene oxide and propylene oxide is sequentially incorporated into the polyol structure. These polyols may also be either primary or secondary hydroxyl group terminated.

In the process of the present invention, the polyol or polyols 10 optionally pass through a static or dynamic mixer 40 before reaching the additives manifold 50 and, if after having passed through the mixer 40, proceeds to the additives manifold 50. Alternatively, the polyol(s) 10 may bypass the static or dynamic mixer 40 and is fed to the additives manifold 50. Prior to the junction A at which the polyol(s) 10 either bypasses the mixer 40 or enters the mixer 40a silicone surfactant 20 may be optionally added.

At the additives manifold 50, several components are continuously fed and mixed. The components are added in any order of addition. The figure numerals referenced imply no particular order of addition. As shown in FIG. 1, for example, a silicone surfactant 20 is added. The additives manifold 50 is the standard point of addition for the silicone surfactant 20. Amine catalyst(s) 22 is also added at this point in the process. An auxiliary blowing agent (ABA) 26 is added. Water 30 is optionally added at the additives manifold 50, although it is preferably added later. Other chemical components that are optionally added at the additives manifold 50 include, but are not limited to, an organometallic catalyst 24 and a flame retardant additive(s) 28. Examples of suitable polyurethane foam flame retardants include, but are not limited to, halogen-containing phosphate esters such as brominated or chlorinated phosphate esters, chlorinated paraffins, melamine powders or phosphorous flame retardant compounds. Examples of such commercially available flame retardants for use in the present invention include, but are not limited to: AB-11714F—Albermarle Corp.; DE-60E-Special and FIREMASTER® 500, 550, and 600—Chemtura Corp.; CP-2—Gulbrandsen Chemicals; FR-2, FR-38, HF-4—ICL, Limited; DISFLAMOLL® DPK—Lanxess Corp. Although a flame retardant may be optionally added, Applicant has surprisingly found that conventional flexible foam of the present invention does not require the use of a flame retardant chemical additive to satisfy the requirements of the State of California's Technical Bulletin 117 for "Requirements, Test Procedure and Apparatus for Testing the Flame Retardance of Resilient Filling Materials Used in Upholstered Furniture," which is the standard in the furniture and bedding industry.

All components fed in and added at the additives manifold 50 are next fed to the dynamic mixer 80. At the main dynamic mixer 80 is also the preferred point of addition for water 30. It is at this point in the process, wherein the foaming reaction begins to take place as the isocyanate 70 begins to simultaneously react with both the polyol(s) and the water in this foam formulation.

There are at least two dispensing methods suitable for use in the present invention for dispensing the mixed stream from the main dynamic mixer, namely trough-pouring 90a or, stationary or traversing direct wet laydown 90b.

In accordance with the method of the present invention, conventional polyether polyol(s) are reacted with isocyanate in the presence of water in the range from about 0.1 to 8.0 based on parts per hundred polyol (pphp), preferably about 2.5 to 6.5 pphp. The reaction of the polyol(s) with the isocyanate proceeds to form polyurethane, considered to compose the primary soft-segment portion of the final skeletal framework of the foam. Simultaneously, the water reacts with the isocyanate to form polyurea considered to compose the hard-segment portion of the foam's final skeletal framework while also liberating carbon dioxide as a bi-product gas. It is this evolution of the carbon dioxide gas via the reaction of water and isocyanate which thereby "blows" the foam hence expanding it into a cellular structure. Therefore, water serves also in this chemistry as the primary blowing agent. In addition to water being the primary blowing agent, an auxiliary blowing agent is added in the range from about 0 to 20 pphp, more preferably from about 0.5 to 15 pphp. Suitable auxiliary blowing agents include, but are not limited to, acetone, pentane, methylene chloride, methyl-formate, water, and $CO_2$. A preferred auxiliary blowing agent is acetone. Such auxiliary blowing agent is commercially available from Sasol Chemicals North America LLC.

In accordance with the present invention, a silicone surfactant is added in the range of from about 0.7 to 3.0 pphp, preferably from about 0.8 to 1.5 pphp. These surfactants include, but are not limited to, modified polydimethylsiloxane copolymers such as of the polyalkyleneoxide polydimethylsiloxane copolymer blend type. Examples of suitable surfactants for use in the present invention include, but are not limited to, conventional slabstock foam surfactants. Examples of commercially available products include, but are not limited to: DABCO® DC-5986—Air Products & Chemicals Inc; TEGOSTAB® B-8228, B-8229, B-8239, B-8242, BF-2370—Evonik Industries; NIAX® L-580, L-590, L-5770, L-603, L-620, L-631, L-635, L-650, L-6202—Momentive Performance Materials.

The balance of these components, along with a use of a catalyst(s), produces a foam product made using MDI that is suitable for furniture and bedding applications. Examples of suitable catalysts for use in the present invention, include but are not limited to, tertiary amine catalysts and organometallic catalysts. Preferred catalysts are amine catalysts and tin catalysts. Examples of commercially available amine catalysts include, but are not limited to: bis-Dimethylaminoethylether amine blends known as DABCO BL-13—Air Products & Chemicals Inc., JEFFCAT® ZF-24—Huntsman Petrochemical Corp. and Niax A-133—Momentive Performance Materials; dibutylaminoethanol (DBAE); dimethylethanolamine (DMEA); 1,2-Dimethylimidazole amine blends known as DM-70—Tosoh USA Inc., DABCO® 2039—Air Products & Chemicals Inc.; tributylamine (IBA); triethylenediamine (TEDA) blend known as TEGOAMIN® 33—Evonik Industries, DABCO® 33LV—Air Products & Chemicals Inc., Niax® A-33—Momentive Performance Materials. Examples of commercially available polyurethane foam tin catalysts include, but are not limited to: stannous octoate blends known as Kosmos 29—Evonik Industries, DABCO® T-9—Air Products & Chemicals Inc.; dibutyltin dilaurate blends known as DABCO® T-12—Air Products & Chemicals Inc., Kosmos 19—Evonik Industries.

A formulating means of controlling the foam hardness is the formulation index. The amount of isocyanate used relative to the theoretical equivalent amount is known as the Isocyanate Index:

$$\text{Isocyanate Index} = \frac{\text{Actual amount of isocyanate used}}{\text{Theoretical amount of isocyanate required}} \times 100$$

The MDI index for the foam of the present invention is maintained in the range of 70 to 130, preferably 100 to 120. The process comprises reacting, at an isocyanate index of 70 to 130, the following components: MDI, polyether polyol(s) as set forth in Table 1, a catalyst(s), a surfactant(s) and water.

Other additives and chemical components which are not necessary to the present invention but may optionally be used include, but are not limited to, flame retardant chemical additives, cross-linking agents, chain-extending agents, melamine, fillers, pigments, dyes, antimicrobials (biocides), antioxidants and the like.

An advantage of the foam of the present invention to the furniture and bedding industry is that it should bridge the technological gap that has prevented the widespread production of MDI slabstock foam in the United States and throughout the world by enabling lower density conventional flexible foams across a wide range of hardness.

EXAMPLES

Several examples were conducted to make laboratory bench foams. Each sample's components (wherein the proportions and exact amounts for which being based on the total amount of polyol being used, 100 pphp, and as set forth in Table 2) were combined into a container as follows: a conventional polyether polyol(s), a polyurethane foam catalyst, silicone surfactant and acetone. These components were pre-mixed via a mixing-prop powered by a drill press at 2000 RPM's for 30 seconds. After this first 30 seconds of pre-mixing, water was added to the pre-mix container with mixing continuing during the addition. Thereafter, five seconds after the water addition, the MDI was added to the mixing container (at which point the reactions between the MDI and both water and polyol simultaneously began) and mixing was continued for an additional 10 seconds after completion of the MDI addition. Immediately following, the drill press/mixing was ceased and the mixture immediately poured into a square cardboard container wherein foam reaction kinetic data (via a thermocouple inserted in through the base of the box) and foam rise profile data (wherein the rate and extent of the foam rise was measured via a level detecting transducer affixed directly above the rising foam) were collected. For each of the bench foam examples, from the time at which the mixing cycle was completed a period of five minutes was realized during which time this data was collected, the foam reached a maximum height, carbon dioxide gas bubbles were observed to de-gas ("blow-off") at the top surface of the foam, and a maximum internal foam reaction temperature was observed and recorded. Thereafter, the bench foam was removed and placed into a curing oven for ten minutes at 150 degrees Fahrenheit. After having initially cured in the oven, the foam sample was removed from the oven and allowed to further cure at ambient room temperatures for twenty-four hours. At this point, the foam was cut and measured in accordance with industry standard ASTM D3574 for the properties listed as in Tables 3, 5 and 7. Tensile & Elongation performance were tested pursuant to ASTM standard D3574, Test E. Tear Strength was measured pursuant to ASTM standard D3574, Test F. Compression set performance was measured pursuant to ASTM standard D3574, Test D.

TABLE 2

Laboratory Bench Example Formulations

| Example ID | | 1 | 2 | 3 | 4 | 5 | 6 | 7 | 8 | 9 |
|---|---|---|---|---|---|---|---|---|---|---|
| Polyol 1 | (php) | | | | | | | 90.00 | | 95.00 |
| Polyol 2 | (php) | 90.00 | 90.00 | 90.00 | 90.00 | 90.00 | 80.00 | | 90.00 | |
| Polyol 3 | (php) | | | | | | 10.00 | | | |
| Polyol 4 | (php) | | | | 10.00 | 10.00 | 10.00 | 10.00 | | 10.00 | |
| Polyol 5 | (php) | 10.00 | 10.00 | | | | | | | 5.00 |
| Polyol 6 | (php) | | | | | | | 10.00 | | |
| FR Additive 1 | (php) | | | | | 14.00 | | | | |
| Water | (php) | 3.00 | 3.00 | 3.00 | 3.00 | 3.00 | 3.00 | 3.00 | 3.00 | 3.00 |
| Acetone | (php) | 6.00 | 6.00 | 6.00 | 6.00 | 6.00 | 6.00 | 6.00 | 6.00 | 6.00 |
| Surfactant 1 | (php) | 0.90 | | | | | | | | |
| Surfactant 2 | (php) | | 0.90 | 1.00 | 1.15 | 1.00 | 1.00 | 1.00 | 1.00 | 1.00 |
| Catalyst 1 | (php) | 0.700 | 0.700 | 0.700 | 0.750 | 0.700 | 0.700 | 0.750 | 0.700 | 0.800 |
| Catalyst 2 | (php) | 0.280 | 0.320 | 0.240 | 0.240 | 0.240 | 0.240 | 0.240 | 0.240 | 0.200 |
| MDI 1 | (php) | 58.72 | 58.72 | 54.72 | 58.55 | 58.55 | 58.02 | 58.55 | 62.38 | |
| MDI 2 | (php) | | | | | | | | | |
| MDI 3 | (php) | | | | | | | | | 66.04 |
| Index | | 107 | 107 | 100 | 107 | 107 | 107 | 107 | 114 | 106.75 |

| Example ID | | 10 | 11 | 12 | 13 | 14 | 15 | 16 |
|---|---|---|---|---|---|---|---|---|
| Polyol 1 | (php) | 92.50 | 90.00 | | 100.00 | 80.00 | | |
| Polyol 2 | (php) | | | 90.00 | | | 90.00 | 90.00 |
| Polyol 3 | (php) | | | | | | | |
| Polyol 4 | (php) | | 10.00 | 10.00 | | 20.00 | 10.00 | 10.00 |

TABLE 2-continued

Laboratory Bench Example Formulations

| | | | | | | | | |
|---|---|---|---|---|---|---|---|---|
| Polyol 5 | (php) | 7.50 | | | 5.00 | | | |
| Polyol 6 | (php) | | | | | | | |
| FR Additive 1 | (php) | | | | | | | |
| Water | (php) | 3.00 | 3.00 | 3.25 | 3.33 | 4.00 | 4.50 | 4.00 |
| Acetone | (php) | 6.00 | 6.00 | 4.00 | 6.00 | 6.00 | 1.50 | |
| Surfactant 1 | (php) | | | | | | | |
| Surfactant 2 | (php) | 1.00 | 1.00 | 1.00 | 1.45 | 1.00 | 1.15 | 0.90 |
| Catalyst 1 | (php) | 0.800 | 0.900 | 0.700 | 1.100 | 0.903 | 0.900 | 0.700 |
| Catalyst 2 | (php) | 0.200 | 0.200 | 0.270 | 0.160 | 0.202 | 0.240 | 0.150 |
| MDI 1 | (php) | | | 62.33 | | 74.5 | 81.25 | 73.68 |
| MDI 2 | (php) | | 60.93 | | 65.15 | | | |
| MDI 3 | (php) | 65.97 | | | | | | |
| Index | | 106.75 | 106.75 | 107 | 103.35 | 107 | 107 | 107 |

TABLE 3

Physical Property and Performance Data for Laboratory Bench Examples

| Example ID | | 1 | 2 | 3 | 4 | 5 | 6 | 7 | 8 | 9 |
|---|---|---|---|---|---|---|---|---|---|---|
| Density | PCF | 1.57 | 1.50 | 1.51 | 1.49 | 1.68 | 1.54 | 1.48 | 1.58 | 1.81 |
| BR | % | 33 | 38 | 35 | 36 | 36 | 31 | 31 | 30 | 32 |
| Air Flow | (SCFM) | 5.75 | 6.00 | 4.75 | 4.25 | 4.75 | 5.00 | 3.75 | 5.50 | 2.50 |
| 25% Original | lb/50 in$^2$ | 10.1 | 9.1 | 11.1 | 12.5 | 12.9 | 14.7 | 13.6 | 15.4 | 23.6 |
| 65% | lb/50 in$^2$ | 18.7 | 17.0 | 19.0 | 21.3 | 22.4 | 25.0 | 23.8 | 26.6 | 40.3 |
| 25% Return | lb/50 in$^2$ | 8.5 | 7.7 | 8.4 | 9.3 | 9.7 | 11.0 | 10.3 | 11.4 | 15.1 |
| Hysteresis | % | 84.1 | 84.9 | 76.4 | 74.8 | 75.3 | 74.3 | 75.3 | 74.3 | 64.1 |
| Support Factor | | 1.86 | 1.87 | 1.72 | 1.71 | 1.74 | 1.70 | 1.74 | 1.73 | 1.71 |
| Tensile | lb/in$^2$ | 8.57 | 9.08 | 7.94 | 8.65 | 8.69 | 10.04 | 8.30 | 10.33 | N/T |
| Tear | lb/in | 1.29 | 1.19 | 1.20 | 1.38 | 1.43 | 1.73 | 1.31 | 1.63 | N/T |
| Elongation | % | 143 | 160 | 173 | 173 | 190 | 183 | 170 | 167 | NTT |

| | Example ID | 10 | 11 | 12 | 13 | 14 | 15 | 16 |
|---|---|---|---|---|---|---|---|---|
| | Density | PCF | 1.65 | 1.72 | 1.60 | 1.52 | 1.41 | 1.50 | 1.80 |
| | BR | % | 35 | 33 | 31 | 31 | 25 | 26 | 26 |
| | Air Flow | (SCFM) | 3.00 | 2.50 | 4.75 | 2.70 | 4.50 | 4.25 | 4.50 |
| | 25% Original | lb/50 in$^2$ | 12.6 | 23.3 | 17.2 | 18.6 | 24.4 | 24.9 | 25.9 |
| | 65% | lb/50 in$^2$ | 22.5 | 39.9 | 29.2 | 29.9 | 38.7 | 45.5 | 49.5 |
| | 25% Return | lb/50 in$^2$ | 8.9 | 14.8 | 12.7 | 11.9 | 13.8 | 15.9 | 17.2 |
| | Hysteresis | % | 70.7 | 63.5 | 73.9 | 64.2 | 56.5 | 63.9 | 66.5 |
| | Support Factor | | 1.78 | 1.72 | 1.70 | 1.61 | 1.58 | 1.83 | 1.91 |
| | Tensile | lb/in$^2$ | N/T | N/T | 8.69 | N/T | N/T | 13.26 | 18.02 |
| | Tear | lb/in | NTT | N/T | 1.47 | N/T | N/T | 1.75 | 1.98 |
| | Elongation | % | N/T | N/T | 143 | N/T | N/T | 157 | 183 |

*-note:
all data specimens were cut to 8" × 8" × 3" for bulk foam properties analysis, including IFD measurement

TABLE 4

Pilot Scale Machine Example Formulations
Pilot Scale Machine Data

Formulation Constants:

| | | |
|---|---|---|
| Mixing speed | 1000 rpm | |
| MDI Injection Pressure | 525-725 | PSIG |
| Silicone | Surfactant 1 | |

| | Example ID | 17 | 18 | 19 | 20 | 21 | 22 | 23 |
|---|---|---|---|---|---|---|---|---|
| Polyol 1 | php | 100.00 | 100.00 | 100.00 | 100.00 | 100.00 | 90.00 | 100.00 |
| Polyol 3 | php | | | | | | 10.00 | |
| Polyol 4 | php | 10.00 | 10.00 | 10.00 | 10.00 | 10.00 | 10.00 | 10.00 |
| Polyol 5 | php | | | | | | | |
| Polyol 6 | php | | | | | | | |
| MDI | Isocyanate | 1 | 1 | 1 | 1 | 1 | 1 | 1 |
| | Index | 107.0 | 107.0 | 114.0 | 100.0 | 107.0 | 107.0 | 107.0 |
| | php | 59.9 | 63.7 | 67.9 | 59.5 | 64.9 | 64.4 | 82.6 |
| Water | php | 3.00 | 3.25 | 3.25 | 3.25 | 3.33 | 3.33 | 4.50 |
| Acetone | php | 6.00 | 6.00 | 6.00 | 6.00 | 6.00 | 6.00 | 1.50 |
| Silicone | php | 1.00 | 1.10 | 1.10 | 1.10 | 1.10 | 1.10 | 1.20 |

TABLE 4-continued

Pilot Scale Machine Example Formulations
Pilot Scale Machine Data

| | | | | | | | | |
|---|---|---|---|---|---|---|---|---|
| Catalyst 1 | php | 0.750 | 0.800 | 0.800 | 0.800 | 0.800 | 0.800 | 0.850 |
| Catalyst 2 | php | 0.240 | 0.240 | 0.240 | 0.240 | 0.240 | 0.240 | 0.240 |
| Catalyst 3 | php | | | | | | | |
| FR Additive #1 | php | | | | | | | |
| Dispensing Method | | 2 | 2 | 2 | 2 | 2 | 2 | 2 |
| Polyol(s) Temp (° F.) | | ambient | ambient | ambient | ambient | ambient | ambient | ambient |
| MDI Temp (° F.) | | ambient | ambient | ambient | ambient | ambient | ambient | ambient |
| Machine Conditions | Temp (° F.) | 75 | 71 | 71 | 71 | NR | NR | 79 |
| | Pressure (inHg) | 28.97 | 29.03 | 29.03 | 29.03 | NR | NR | 29.26 |
| | Humidity (%) | 51 | 25 | 25 | 25 | NR | NR | 23 |

| | | Example ID | 24 | 25 | 26 | 27 | 28 | 29 |
|---|---|---|---|---|---|---|---|---|
| | Polyol 1 | php | 90.00 | 100.00 | 100.00 | 100.00 | 100.00 | 100.00 |
| | Polyol 3 | php | 10.00 | | | | | |
| | Polyol 4 | php | 10.00 | | | | | |
| | Polyol 5 | php | | 2.25 | 3.00 | 4.00 | 5.00 | 10.00 |
| | Polyol 6 | php | | | | | | |
| | MDI | Isocyanate | 1 | 2 | 2 | 2 | 2 | 2 |
| | | Index | 107.0 | 108.0 | 108.0 | 108.0 | 108.0 | 107.0 |
| | | php | 82.1 | 64.9 | 64.9 | 65.0 | 65.2 | 65.1 |
| | Water | php | 4.50 | 3.33 | 3.33 | 3.33 | 3.33 | 3.33 |
| | Acetone | php | 1.50 | 6.00 | 6.00 | 6.00 | 6.00 | 6.00 |
| | Silicone | php | 1.20 | 1.45 | 1.45 | 1.45 | 1.45 | 1.10 |
| | Catalyst 1 | php | 0.850 | 1.100 | 1.100 | 1.100 | 1.100 | 0.850 |
| | Catalyst 2 | php | 0.240 | 0.160 | 0.160 | 0.160 | 0.160 | 0.240 |
| | Catalyst 3 | php | | | | | | |
| | FR Additive #1 | php | | | | | | |
| | Dispensing Method | | 2 | 2 | 2 | 2 | 2 | 2 |
| | Polyol(s) Temp (° F.) | ambient | ambient | ambient | ambient | ambient | ambient | ambient |
| | MDI Temp (° F.) | ambient | ambient | ambient | ambient | ambient | ambient | ambient |
| | Machine Conditions | Temp (° F.) | 79 | 95 | 95 | 95 | 95 | 97 |
| | | Pressure (inHg) | 29.26 | 29.23 | 29.23 | 29.23 | 29.23 | 29.06 |
| | | Humidity (%) | 23 | 31 | 31 | 31 | 31 | 28 |

TABLE 5

Physical Property and Performance Data for Pilot Scale Machine Examples

| | | | Example ID | 17 | 18 | 19 | 20 | 21 | 22 | 23 | 24 |
|---|---|---|---|---|---|---|---|---|---|---|---|
| | Density | (PCF) | | 1.56 | 1.56 | 1.58 | 1.56 | 1.55 | 1.60 | 1.50 | 1.51 |
| | Ball Rebound | (%) | | 35 | 39 | 33 | 35 | 35 | 35 | 29 | 33 |
| | Airflow (15" × 15" × 4") | (SCFM) | | 4.00 | 4.25 | 4.25 | 3.75 | 4.50 | 4.00 | 4.00 | 4.00 |
| IFD (15" × 15" × 4") | 25% (lbs/50 sq.in.) | Orig | | 19.0 | 18.4 | 25.0 | 16.9 | 19.1 | 19.6 | 32.2 | 34.0 |
| | 65% (lbs/50 sq.in.) | | | 35.4 | 36.2 | 49.0 | 32.5 | 35.9 | 42.6 | 59.8 | 64.1 |
| | 25% (lbs/50 sq.in.) | Return | | 14.2 | 13.9 | 18.3 | 12.3 | 14.1 | 14.3 | 20.6 | 21.0 |
| | Hystersis | (%) | | 74.8 | 75.3 | 73.2 | 72.6 | 74.1 | 73.0 | 64.0 | 61.8 |
| | Support Factor | | | 1.87 | 1.96 | 1.96 | 1.93 | 1.88 | 2.18 | 1.86 | 1.89 |
| | Tensile | PSI | | 9.0 | 9.7 | 11.0 | 8.9 | 10.7 | 13.6 | 13.6 | 15.1 |
| | Tear | PLI | | 1.18 | 1.15 | 1.30 | 0.92 | 1.23 | 1.51 | 1.60 | 1.40 |
| | Elongation | (%) | | 183 | 177 | 170 | 187 | 163 | 153 | 140 | 147 |
| | 90% Compression Set | (%) | | 6.7 | 8.6 | 7.9 | 7.3 | 8.6 | 11.4 | 10.4 | 12.6 |
| Dynamic Fatigue | 20,000 cycles at 200 Ib$_f$ | HtLoss (%) | | 4.1 | 3.9 | 3.9 | 2.2 | 2.9 | 4.6 | 3.7 | 3.7 |
| | | ILD Loss (%) | | 19.3 | 17.4 | 19.4 | 26.5 | 19.0 | 18.6 | 25.5 | 25.6 |
| CAL-117 Flammability | Smolder | | | NT | NT | NT | NT | NT | NT | NT | 98.0 |
| | VERTICAL | Non-Aged | | PASS | PASS | PASS | PASS | PASS | PASS | PASS | PASS |
| | | Aged | | PASS | PASS | PASS | PASS | PASS | PASS | PASS | PASS |

| | | | Example ID | 25 | 26 | 27 | 28 | 29 |
|---|---|---|---|---|---|---|---|---|
| | | Density | (PCF) | 1.64 | 1.62 | 1.56 | 1.54 | 1.58 |
| | | Ball Rebound | (%) | 34 | 35 | 38 | 38 | 32 |
| | | Airflow (15" × 15" × 4") | (SCFM) | 1.50 | 2.00 | 2.00 | 3.25 | 3.00 |
| | IFD (15" × 15" × 4") | 25% (lbs/50 sq.in.) | Orig | 32.1 | 28.8 | 24.9 | 20.2 | 14.8 |
| | | 65% (lbs/50 sq.in.) | | 62.8 | 56.3 | 48.5 | 36.5 | 27.2 |
| | | 25% (lbs/50 sq.in.) | Return | 22.1 | 20.2 | 18.0 | 14.7 | 11.4 |
| | | Hystersis | (%) | 69.0 | 70.0 | 72.1 | 72.4 | 76.7 |
| | | Support Factor | | 1.96 | 1.95 | 1.95 | 1.80 | 1.83 |

TABLE 5-continued

Physical Property and Performance Data for Pilot Scale Machine Examples

|   |   |   |   |   |   |   |   |
|---|---|---|---|---|---|---|---|
|   | Tensile | PSI | 10.5 | 9.6 | 9.9 | NT | NT |
|   | Tear | PLI | 0.85 | 0.92 | 0.70 | NT | NT |
|   | Elongation | (%) | 110 | 120 | 107 | NT | NT |
|   | 90% Compression Set | (%) | 8.6 | 8.5 | 7.9 | NT | NT |
| Dynamic Fatigue | 20,000 cycles at 200 lb$_f$ | HtLoss (%) | NT | NT | NT | NT | NT |
|   |   | ILD Loss (%) | NT | NT | NT | NT | NT |
| CAL-117 Flammability | Smolder | | 93.9 | 92.3 | 96.2 | 98.7 | 99.2 |
|   | VERTICAL | Non-Aged | FAIL | FAIL | FAIL | FAIL | FAIL |
|   |   | Aged | NT | FAIL | NT | NT | NT |

TABLE 6

Pilot Scale Machine Example Formulations
Pilot Scale Machine Data

Formulation Constants:

| Mixing speed | 1000 rpm | |
|---|---|---|
| MDI Injection Pressure | 525-725 | PSIS |
| Silicone | Surfactant 1 | |

|   |   | Example ID | 30 | 31 | 32 | 33 | 34 | 35 | 36 |
|---|---|---|---|---|---|---|---|---|---|
| Polyol 1 | php | | 100.00 | 100.00 | 100.00 | 100.00 | 79.00 | 80.00 | 80.00 |
| Polyol 3 | php | | | | | | | | |
| Polyol 4 | php | | 18.18 | 18.18 | 18.00 | 18.00 | 18.23 | | |
| Polyol 5 | php | | | | | | | | |
| Polyol 6 | php | | | | | | | 20.00 | 20.00 |
| MDI | Isocyanate | | 2 | 2 | 2 | 2 | 2 | 2 | 2 |
|   | Index | | 107.8 | 107.8 | 107.8 | 107.8 | 108.3 | 104.0 | 94.0 |
|   | php | | 66.3 | 66.3 | 66.2 | 66.2 | 66.2 | 62.7 | 56.7 |
| Water | php | | 3.33 | 3.33 | 3.33 | 3.33 | 3.33 | 3.33 | 3.33 |
| Acetone | php | | 6.00 | 6.00 | 6.00 | 6.00 | 6.00 | 6.00 | 6.00 |
| Silicone | php | | 1.45 | 1.45 | 1.45 | 1.45 | 1.45 | 1.45 | 1.45 |
| Catalyst 1 | php | | 1.100 | 0.950 | 0.900 | 0.875 | 0.950 | 0.800 | 0.800 |
| Catalyst 2 | php | | 0.160 | 0.160 | 0.170 | 0.185 | 0.160 | | |
| Catalyst 3 | php | | | | | | | 0.370 | 0.370 |
| FR Additive #1 | php | | | | | | | 5.0 | 5.0 |
| Dispensing Method | | | 2 | 2 | 2 | 2 | 1 | 2 | 2 |
| Polyol(s) Temp (° F.) | | | ambient | ambient | ambient | ambient | 60 | 73 | 73 |
| MDI Temp (° F.) | | | ambient | ambient | ambient | ambient | 60 | 84 | 84 |
| Machine Conditions | Temp (° F.) | | 86 | 86 | 89 | 89 | 89 | 81 | 81 |
|   | Pressure (inHg) | | 28.97 | 28.97 | 28.94 | 28.94 | 29.15 | 29.38 | 29.38 |
|   | Humidity (%) | | 34 | 34 | 28 | 28 | 37 | 23 | 23 |
|   |   | Example ID | 37 | 38 | 39 | 40 | 41 | 42 | |
| Polyol 1 | php | | 80.40 | 80.00 | 82.00 | 82.00 | 80.00 | 84.00 | |
| Polyol 3 | php | | | | | | | | |
| Polyol 4 | php | | | | | | | | |
| Polyol 5 | php | | | | | | | | |
| Polyol 6 | php | | 19.60 | 20.00 | 18.00 | 18.00 | 20.00 | 16.00 | |
| MDI | Isocyanate | | 2 | 2 | 2 | 2 | 2 | 2 | |
|   | Index | | 105.5 | 105.0 | 102.5 | 102.5 | 105.0 | 102.5 | |
|   | php | | 58.6 | 58.3 | 79.2 | 79.2 | 56.8 | 94.1 | |
| Water | php | | 3.00 | 3.00 | 4.50 | 4.50 | 2.90 | 5.50 | |
| Acetone | php | | 8.00 | 9.50 | 8.00 | 8.00 | 4.25 | 9.50 | |
| Silicone | php | | 1.45 | 1.45 | 1.50 | 1.50 | 1.45 | 1.50 | |
| Catalyst 1 | php | | 0.780 | 0.780 | 1.200 | 1.200 | 0.650 | 1.600 | |
| Catalyst 2 | php | | | | | | | | |
| Catalyst 3 | php | | 0.400 | 0.400 | 0.320 | 0.320 | 0.320 | 0.320 | |
| FR Additive #1 | php | | 5.0 | 5.0 | 5.0 | 5.0 | 5.0 | 5.0 | |
| Dispensing Method | | | 2 | 2 | 2 | 2 | 2 | 2 | |
| Polyol(s) Temp (° F.) | | | 68 | 68 | 68 | 69 | 69 | 67 | |
| MDI Temp (° F.) | | | 86 | 85 | 81 | 85 | 85 | 80 | |
| Machine Conditions | Temp (° F.) | | 85 | 83 | 81 | 86 | 84 | 82 | |
|   | Pressure (inHg) | | 29.29 | 29.41 | 29.29 | 28.91 | 28.88 | 29.12 | |
|   | Humidity (%) | | 22 | 23 | 32 | 28 | 28 | 29 | |

TABLE 7

Physical Property and Performance Data for Pilot Scale Machine Examples

| | | Example ID | 30 | 31 | 32 | 33 | 34 | 35 | 36 |
|---|---|---|---|---|---|---|---|---|---|
| | Density | (PCF) | 1.69 | 1.60 | 1.77 | 1.75 | 1.53 | 1.50 | 1.53 |
| | Ball Rebound | (%) | 39 | 38 | 37 | 36 | 37 | 35 | 30 |
| | Airflow (15" × 15" × 4") | (SCFM) | 2.25 | 2.00 | 2.50 | 2.75 | 2.75 | 2.75 | 2.00 |
| IFD | 25% (lbs/50 sq.in.) | Orig | 24.6 | 21.3 | 21.9 | 21.5 | 25.4 | 23.3 | 16.9 |
| (15" × 15" × 4") | 65% (lbs/50 sq.in.) | | 46.0 | 39.7 | 43.3 | 44.0 | 45.5 | 46.0 | 35.0 |
| | 25% (lbs/50 sq.in.) | Return | 18.2 | 15.9 | 16.2 | 15.9 | 17.2 | 15.9 | 11.6 |
| | Hystersis | (%) | 73.9 | 74.6 | 74.0 | 74.0 | 67.7 | 68.4 | 68.6 |
| | Support Factor | | 1.87 | 1.86 | 1.97 | 2.05 | 1.79 | 1.97 | 2.07 |
| | Tensile | PSI | NT | NT | 8.4 | 7.3 | NT | 11.8 | 11.2 |
| | Tear | PLI | NT | NT | 0.71 | 0.93 | NT | 1.14 | 0.80 |
| | Elongation | (%) | NT | NT | 140 | 113 | NT | 110 | 127 |
| 90% Compression Set | | (%) | NT | NT | 8.7 | 9.5 | NT | 11.9 | 85.5 |
| Dynamic | 20,000 cycles at 200 | HtLoss (%) | NT | NT | NT | NT | NT | NT | 0.9 |
| Fatigue | lb$_f$ | ILD Loss (%) | NT | NT | NT | NT | NT | NT | 20.6 |
| CAL-117 | Smolder | | 98.4 | NT | NT | 97.0 | NT | NT | NT |
| Flammability | VERTICAL | Non-Aged | FAIL | NT | NT | FAIL | NT | FAIL | FAIL |
| | | Aged | NT | NT | NT | NT | NT | NT | NT |

| | | Example ID | 37 | 38 | 39 | 40 | 41 | 42 |
|---|---|---|---|---|---|---|---|---|
| | Density | (PCF) | 1.54 | 1.49 | 1.18 | 1.19 | 1.77 | 1.08 |
| | Ball Rebound | (%) | 33 | 36 | 32 | 31 | 36 | 31 |
| | Airflow (15" × 15" × 4") | (SCFM) | 2.50 | 2.25 | 2.50 | 2.25 | 2.25 | 2.00 |
| IFD | 25% (lbs/50 sq.in.) | Orig | 24.1 | 20.7 | 25.4 | 25.4 | 26.0 | 29.3 |
| (15" × 15" × 4") | 65% (lbs/50 sq.in.) | | 46.8 | 40.8 | 49.1 | 50.0 | 50.8 | 58.6 |
| | 25% (lbs/50 sq.in.) | Return | 17.2 | 14.8 | 15.3 | 15.3 | 18.7 | 16.1 |
| | Hystersis | (%) | 71.1 | 71.7 | 60.2 | 60.2 | 72.2 | 55.1 |
| | Support Factor | | 1.94 | 1.97 | 1.93 | 1.97 | 1.96 | 2.00 |
| | Tensile | PSI | 10.0 | 9.9 | 12.5 | 11.7 | 12.2 | 12.2 |
| | Tear | PLI | 0.97 | 1.02 | 1.26 | 1.03 | 1.08 | 1.03 |
| | Elongation | (%) | 117 | 127 | 97 | 110 | 120 | 87 |
| 90% Compression Set | | (%) | 10.4 | 13.7 | 75.9 | 81.3 | 8.9 | 75.9 |
| Dynamic | 20,000 cycles at 200 | HtLoss (%) | NT | NT | NT | 2.6 | 0.9 | NT |
| Fatigue | lb$_f$ | ILD Loss (%) | NT | NT | NT | 30.3 | 17.9 | NT |
| CAL-117 | Smolder | | NT | NT | NT | NT | NT | NT |
| Flammability | VERTICAL | Non-Aged | FAIL | FAIL | FAIL | FAIL | FAIL | FAIL |
| | | Aged | NT | NT | NT | NT | NT | NT |

Notes to Tables 2, 3, 4, 5, 6 and 7:

Polyol 1 is a 56 OH 3000 molecular weight conventional polyether polyol

Polyol 2 is a 56 OH 3000 molecular weight conventional polyether polyol

Polyol 3 is a 28 OH conventional slabstock polyether graft polymer polyol

Polyol 4 is a 37.5 OH 3000 molecular weight polyether polyol

Polyol 5 is a 39 OH 2800 molecular weight polyether polyol

Polyol 6 is a 37.5 OH 3000 molecular weight polyether polyol

Catalyst 1 is a 1,2-dimethylimidazole amine catalyst blend in ethylene glycol

Catalyst 2 is a bis(dimethylaminoethyl)ether amine catalyst blend in dipropylene glycol Catalyst 3 is a bis(dimethylaminoethyl)ether amine catalyst blend in dipropylene glycol Silicone 1 is a modified silicone surfactant blend Silicone 2 is a modified silicone surfactant blend Flame Retardant 1 is 2-propanol, 1,3 dichloro-,phosphate MDI 1 is a MDI blend of Diphenylmethane-4-4'-diisocyanate and polymeric MDI having a NCO content of 33%

MDI 2 is a MDI blend of Diphenylmethane-4-4'-diisocyanate and Diphenylmethanediisocyanate isomers, and polymeric MDI having a NCO content of 32.3%

MDI 3 is a MDI blend of Diphenylmethanediisocyanate isomers with the reaction product of polyol with methylenediphenyl diisocyanate having a NCO content of 29.9%

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A flexible polyurethane foam having a bulk foam density of 2.5 pounds per cubic foot or lower and having a foam hardness or 25% Indentation Force Deflection (IFD) in a range of 10 to 90 lb/50 in$^2$, wherein the foam results from a reaction of methylene diphenyl diisocyanate (MDI) with a polyalkyleneoxide polyether polyol and water in the presence of at least a 1,2-dimethylimidazole amine catalyst, a silicone surfactant, and an auxiliary blowing agent and without a tin catalyst and without toluene diisocyanate (TDI), and wherein the foam made without the use of a flame retardant additive passes the requirements of State of California Technical Bulletin 117.

2. The flexible polyurethane foam according to claim 1, wherein the foam hardness or 25% IFD is measured in accordance with test method ASTM 3574—Test $B_1$.

3. The flexible polyurethane foam according to claim 1, wherein the bulk foam density is 1.8 pounds per cubic foot or lower.

4. The flexible polyurethane foam according to claim 1, wherein the MDI is pure or comprises a mixture of isomers.

5. The flexible polyurethane foam according to claim 4, wherein the mixture is in any amount or in any ratio of isomers selected from the group consisting of 4,4'-diphenylmethane diisocyanate, 2,4'-diphenylmethane diisocyanate, 2,2'-diphenylmethane diisocyanate, and a combination thereof.

6. The flexible polyurethane foam according to claim 4, wherein the mixture is blended with a polymeric, modified, or prepolymer MDI species.

7. The flexible polyurethane foam according to claim 4, wherein the isomers have a blend average isocyanate functionality of ≥2.

8. The flexible polyurethane foam according to claim 1, wherein the foam has an isocyanate index or stoichiometric amount in a range of 70 to 130.

9. The flexible polyurethane foam according to claim 8, wherein the foam has an isocyanate index or stoichiometric amount in a range of 100 to 120.

10. The flexible polyurethane foam according to claim 1, wherein the foam is made with or without a graft polyol.

11. The flexible polyurethane foam according to claim 1, wherein the foam is made using a polyalkyleneoxide polyether polyol having a molecular weight in a range of from about 700 to 4,000 g/mol with a weight percent content of ethylene oxide groups content being from about zero to 75 weight percent of total alkylene oxide group content while having a hydroxyl functionality ranging from about 2 to 8.

12. The flexible polyurethane foam according to claim 11, wherein the foam is made using a polyalkyleneoxide polyether polyol having a molecular weight in a range of from about 700 to 4,000 g/mol with a weight percent content of ethylene oxide groups content being from about zero to 75 weight percent of total alkylene oxide group content while having a hydroxyl functionality ranging from about 2 to 3.

13. The flexible polyurethane foam according to claim 1, wherein the foam is made using a polyalkyleneoxide polyether polyol having a molecular weight in a range of from about 700 to 4,000 g/mol with 25 to 100 weight percent of total alkylene oxide groups being propylene oxide groups while having a hydroxyl functionality ranging from about 2 to 8.

14. The flexible polyurethane foam according to claim 1, wherein the foam is made using a polyalkyleneoxide polyether polyol having a molecular weight in a range of from about 700 to 4,000 g/mol with 25 to 100 weight percent of total alkylene oxide groups being propylene oxide groups while having a hydroxyl functionality ranging from about 2 to 3.

15. The flexible polyurethane foam according to claim 1, wherein the foam is made with or without a load-bearing or support-enhancing polyol selected from the group consisting of copolymer polyol, polymer polyol, graft polyol, PIPA polyol, crosslinker, polyhamstoff dispersion (PHD) polyol, and any combination thereof.

16. The flexible polyurethane foam according to claim 1, the foam comprises an additive selected from the group consisting of a flame retardant, a cross-linking agent, a chain-extending agent, melamine, a filler, a pigment, a dye, an antimicrobial, a biocide, an antioxidant, and a combination thereof.

17. The flexible polyurethane foam according to claim 1, wherein the flexible polyurethane foam has a support factor lower than that of a high resilience polyurethane foam and a resilience lower than that of a high resilience polyurethane foam.

18. A flexible polyurethane foam having a bulk foam density of 2.5 pounds per cubic foot or lower and having a foam hardness or 25% Indentation Force Deflection (IFD) in a range of 10 to 90 lb/50 in$^2$, wherein the foam results from a reaction of methylene diphenyl diisocyanate (MDI) with a polyalkyleneoxide polyether polyol having a molecular weight in a range of from about 700 to 4,000 g/mol and a primary blowing agent of water in the presence of at least a 1,2-dimethylimidazole amine catalyst, a silicone surfactant, and an auxiliary blowing agent of acetone and without a tin catalyst and without toluene diisocyanate (TDI), and wherein acetone is in a range of 1.5 to 9.5 pphp, and wherein the foam made without the use of a flame retardant additive passes the requirements of State of California Technical Bulletin 117.

* * * * *